United States Patent [19]

Shih

[11] Patent Number: 5,859,116
[45] Date of Patent: Jan. 12, 1999

[54] CLARITY AND ADJUSTABLE SHRINKAGE OF SHRINK FILMS USING MISCIBLE POLYESTER BLENDS

[75] Inventor: Wayne Ken Shih, Kingsport, Tenn.

[73] Assignee: Eastman Chemical Company, Kingsport, Tenn.

[21] Appl. No.: 784,614

[22] Filed: Jan. 21, 1997

[51] Int. Cl.$^6$ .............................. C08K 3/36; C08G 63/02
[52] U.S. Cl. ............................................................ 524/493
[58] Field of Search ............................ 524/493, 89, 602; 528/308.1, 308.2–308.7, 275, 272, 308

[56] References Cited

U.S. PATENT DOCUMENTS

| | | | |
|---|---|---|---|
| 4,745,174 | 5/1988 | Pruett et al. | 528/289 |
| 4,939,232 | 7/1990 | Fukuda et al. | 528/272 |
| 5,372,864 | 12/1994 | Weaver et al. | 428/36.92 |
| 5,688,899 | 11/1997 | Strand et al. | 528/308 |

*Primary Examiner*—Vasu Jagannathan
*Assistant Examiner*—Olga Asinovsky
*Attorney, Agent, or Firm*—Cheryl J. Tubach; Harry J. Gwinnell

[57] ABSTRACT

A heat-shrinkable film is made from a copolyester blend of 1 to 98.5 weight percent PETG copolyester, 98.5 to 1 weight DEG modified PET copolyester having a b* value of less than 15, 0.5 to 3 weight percent anti-blocking agent, and optionally, 5 to 15 weight percent crystallizable polyester. The PETG copolyester has a dicarboxylic acid component of at least 95 mol percent terephthalic acid and a diol component of 65 to 80 mol percent ethylene glycol and 35 to 20 mol percent 1,4-cyclohexane-dimethanol. The DEG modified PET copolyester has a dicarboxylic acid component of at least 75 mol percent terephthalic acid; a diol component of 10 to 50 mol percent diethylene glycol and 50 to 90 mol percent ethylene glycol; catalyst residues of 20 to 100 ppm manganese, 50 to 300 ppm antimony, 0 to 100 ppm titanium and 40 to 150 ppm phosphorus; and color control agent residues of (i) 40 to 100 ppm cobalt, (ii) 1.5 to 10 ppm of blue compounds of substituted 1,4-bis(2,6-dialylanilino) anthraquinones and 0.5 to 6 ppm of red compounds of anthraquinones, or (iii) 0.5 to 10 ppm of 1-cyano-3H-dibenz isoquinoline-2,7-diones.

5 Claims, No Drawings

CLARITY AND ADJUSTABLE SHRINKAGE OF SHRINK FILMS USING MISCIBLE POLYESTER BLENDS

TECHNICAL FIELD

This invention relates to heat-shrinkable plastic films. More particularly, this invention relates to particular polyester blends useful as the materials to make heat-shrinkable films.

BACKGROUND OF THE INVENTION

Heat-shrinkable plastic films are used as coverings, to hold objects together, and as an outer wrapping for bottles, cans and other kinds of containers. For example, such films are used for covering the cap, neck, shoulder or bulge of bottles or for the entire bottles; for the purpose of labelling, protection, parceling, or increasing the value of the product; and for other reasons. In addition, such films may be used as a covering to package such objects as boxes, bottles, boards, rods, or notebooks together in groups, and such films may also be attached closely as a wrapping. The uses mentioned above take advantage of the shrinkability and the internal shrink stress of the film.

Shrink films can be classified into two categories as follows: (1) biaxially oriented film for over-wrapping wherein the film shrinks in both the x- and y-axis directions, and (2) uniaxially oriented sleeves which are widely used as tamper evident labels on food and pharmaceutical products and as primary labels on soft drink bottles. This film primarily shrinks in the stretched or oriented direction and has a little shrinkage in the unstretched or nonoriented direction. A 10 percent or less shrinkage in the unstretched direction is desirable to compensate the thermal relaxation of the shrink film during heating. Usually these films are made into a tube shape, and after being wrapped around a bottle or around more than one pipe, for example, the film is shrunk by the application of heat so as to wrap or to parcel together the object or objects.

The materials used for the films mentioned above include polyvinylchloride (PVC), polystyrene (OPS), oriented polyethylene, oriented polypropylene, hydrochlorinated rubber, and polyesters. PVC is the most widely used material due to its excellent shrink properties and clarity. However, environmental concerns exist with PVC. Replacement materials which are more environmentally friendly, have comparable heat-shrinkable properties and are substantially free of haze are desirous.

The prime choice to compete with PVC for shrink films has been copolyester blends of 1,4-cyclohexanedimethanol modified polyethylene terephthalate (known as PETG), a low glass transition temperature polyester or copolyester such as diethylene glycol modified polyethylene terephthalate (DEG modified PET) and, optionally, a crystallizable polyester such as polyethylene terephthalate (PET). The onset shrink temperature of these copolyester blends, while somewhat higher than the onset temperature of PVC, is close enough that existing shrink tunnels designed for PVC may be used. However, only up to 10 percent of the DEG modified PET may be used in the blends due to the occurrence of haze in the final heat-shrinkable film. The haze is caused by the high degree of yellow color in the DEG modified PET. Due to the nature of manufacturing technology, DEG modified PET, known commercially as EASTOBOND Copolyester 13162 available from Eastman Chemical Company of Kingsport, Tenn. has a b* color value (yellowness index) in pellet form of about 25. In order to increase the amount of DEG modified PET and possibly lower the onset shrink temperature of the polyester blends, a DEG modified PET would need to have a b* color value in pellet form substantially lower than conventional technology permits.

Thus, there exists a need in the art to have a heat-shrinkable copolyester film that has an onset temperature the same or lower than PVC film and does not produce undesired haze levels. Accordingly, it is to the provision of such that the present invention is primarily directed.

SUMMARY OF THE INVENTION

A heat-shrinkable film is provided comprising a copolyester blend of:

(a) about 1 to about 98.5 percent by weight of a PETG copolyester comprising 100 mol percent dicarboxylic acid residue component of at least 95 mol percent terephthalic acid residues and 100 mol percent diol residue component of about 65 to about 80 mol percent ethylene glycol residues and about 35 to about 20 mol percent 1,4-cyclohexanedimethanol residues;

(b) about 98.5 to about 1 percent by weight of a DEG modified PET copolyester having a b* color value in pellet form of less than 15, preferably less than 10; comprising 100 mol percent dicarboxylic acid residue component of at least 75 mol percent terephthalic acid residues and 100 mol percent diol residue component of about 10 to about 50 mole percent diethylene glycol residues and about 50 to about 90 mol percent ethylene glycol residues; catalyst residues of about 20 to about 100 ppm manganese, about 50 to about 300 ppm antimony, 0 to about 100 ppm titanium and about 40 to about 150 ppm phosphorus, based on the weight of the DEG modified PET copolyester; and color control agent residues of either (i) about 40 to about 100 ppm cobalt, (ii) about 1.5 to about 10 ppm of blue compounds of substituted 1,4-bis(2,6-dialylanilino) anthraquinones and about 0.5 to about 6 ppm of red compounds of anthraquinones and (iii) about 0.5 to about 10 ppm of 1-cyano-3H-dibenz[f,ij] isoquinoline-2,7-diones, all ppm based on the weight of the DEG modified PET copolyester.

(c) about 0.5 to about 3 percent by weight of anti-blocking agent, and, optionally, (d) about 5 to about 15 percent by weight of a crystallizable polyester such as polyethylene terephthalate (PET) or slightly modified PET.

A primary advantage of this invention is that the problem with haze in the heat-shrinkable films is eliminated by using an improved clarity DEG modified PET in the polyester blend. Further, since there is no limitation on the amount of DEG modified PET used in the polyester blends, heat-shrinkable films may now be produced with varying degrees of thermal shrinkage behavior even lower than that of typical PVC.

DESCRIPTION OF THE INVENTION

This invention relates to novel copolyester blends for use in heat-shrinkable film applications. Uniaxially oriented films made from these copolyester blends satisfy the requirements for shrink label applications of more than 50 percent ultimate shrinkage in the hoop direction, i.e. around the package, and 10 percent or less in the axial direction. These novel copolyester blends are substantially free of haze with a b* color value in film form, as described below, of about 0.09 to 1.10 and are versatile in producing a wide spectrum of shrink films with adjustable on-set temperatures to even lower than that of typical PVC.

The copolyester blend comprises the following components:

(a) about 1 to about 98.5 percent by weight 1,4-cyclohexanedimethanol modified polyethylene terephthalate (PETG);

(b) about 98.5 to about 1 percent by weight diethylene glycol (DEG) modified polyethylene terephthalate (PET), which is a low glass transition temperature copolyester;

(c) about 0.5 to about 3 percent by weight of anti-blocking agent, which prevents the film from sticking to itself; and optionally, (d) about 5 to about 15 percent by weight crystallizable polyester such as polyethylene terephthalate (PET).

Component (a), the PETG copolyester, comprises at least 95 mol percent terephthalic acid residues; about 65 to about 80 mol percent ethylene glycol residues, preferably 65 to 75 mol percent and more preferably 67 to 71; and about 35 to about 20 mol percent 1,4-cyclohexanedimethanol residues, preferably 35 to 25 mol percent and more preferably 33 to 29 mol percent. The above mol percentages are based on 100 mol percent dicarboxylic acid residue component and 100 mol percent diol residue component.

The percentage by weight of component (a) in the copolyester blend is preferably 5 to 90, more preferably 40 to 85 and even more preferably 60 to 85.

The dicarboxylic acid component of the PETG copolyester in this invention consists essentially of terephthalic acid residues. The acid component may be modified with up to about 5 mol percent of other acids which may contain 3 to 20 carbon atoms and may consist of units of aromatic, aliphatic, or alicyclic dicarboxylic acids- or combinations of these dicarboxylic acids. Examples of useful aliphatic dicarboxylic acids are malonic, succinic, glutaric, adipic, pimelic, suberic, azelaic, sebacic, dodecanedioic, 1,4-, 1,5-, and 2,6-decahydronaphthalenedicarboxylic acid, and cis- or trans-1,4-cyclohexanedicarboxylic acid. Examples of useful aromatic dicarboxylic acids are terephthalic acid, isophthalic acid, 4,4'-biphenyldicarboxylic, trans 3,3'- and trans-4,4'-stilbenedicarboxylic acid, 4,4'-dibenzyl-dicarboxylic acid, 1,4-, 1,5-, 2,3-, 2,6, and 2,7-naphthalenedicarboxylic acid.

The diol residue component of the PETG copolyester useful in this invention may be replaced with up to about 35 mol percent of other aliphatic glycols, containing from about 2 to about 10 carbon atoms such as 1,3-propanediol, neopentyl glycol, 1,4-butanediol, 1,5-pentanediol or 1,6-hexanediol.

In a preferred embodiment, the 1,4-cyclohexane dimethanol residue is a cis-/trans-mixture of 1,4-cyclohexanedimethanol.

Component (b), the DEG modified PET copolyester, is an improved clarity copolyester having reduced yellowness by the combination of a color control agent and a novel catalyst system as disclosed in a patent application filed concurrently entitled "Improved Clarity Copolyester" to Marc A. Strand et al. In comparison to conventional DEG modified PET with a b* color value in pellet form of about 25, the improved clarity DEG modified PET has a b* color value of less than 15, preferably less than 10.

The b* color value is based on the CIELAB color scale using the following parameters: 1) D65 Illuminant, 2) 10 degree observer, 3) specular included and 4) large area view. The b* color value measures yellowness when plus and blueness when minus. At b* equals zero, the specimen is colorless, i.e. essentially clear. The preferred device used to measure b* color value is a HunterLab Ultrascan Colorimeter available from Hunter Associates Laboratory.

The b* color value is affected by sample form, thus for comparison of clarity the type of sample should be noted in discussing results. The b* color values measured on samples in pellet form are measured by using conventional polyester pellets. The pellets are approximately 2–3 mm in diameter, 2–3 mm in length and weigh 0.8 gms/50 pellets. In the present invention DEG modified PET pellets are placed in a glass sample holder having a thickness of 2 cm with a black background. The color measurement is by reflectance. The b* color values for samples in film form are measured through the thickness of the as extruded film (pre-stretched), which in the present invention is 8.5 mils (0.2 mm).

The DEG modified PET copolyester has an inherent viscosity of about 0.4 to 1.2 dL/g and comprises 100 mol percent dicarboxylic acid residue component, 100 mol percent diol residue component, catalyst residues and color control agent residues.

The dicarboxylic acid residue component of the DEG modified PET copolyester comprises at least 75 mol percent of terephthalic acid residues. Up to about 25 mol percent of the dicarboxylic acid residue component may consist of residues of one or more aliphatic, alicyclic, or aromatic dicarboxylic acids other than terephthalic acid. Examples of such other dicarboxylic acids include isophthalic acid, 1,4-cyclohexane-dicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like.

The diol residue component of the DEG modified PET copolyester comprises about 10 to about 50 mol percent diethylene glycol residue and about 50 to about 90 mol percent ethylene glycol (EG) residue. Preferably the diethylene glycol residue ranges from 25 to 50 mol percent, more preferably 32 to 40 mol percent. Preferably the ethylene glycol residue ranges from 75 to 90 mol percent, more preferably 60 to 68 mol percent. The diol residue component may include up to about 10 mol percent of conventional diols such as propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, neopentyl glycol, 1,5-pentanediol, 1,6-hexanediol, 1,8-octanediol, 2,2,4-trimethyl-1,6-hexanediol, thiodiethanol, 1,2-cyclo-hexanedimethanol, 1,3-cyclohexanedimethanol, 2,2,4,4-tetramethyl-1,3-cyclobutanediol and the like.

The catalyst system for the DEG modified PET copolyester comprises catalyst residues of about 20 to about 100 ppm manganese, about 50 to about 300 ppm antimony, 0 to about 100 ppm titanium and about 40 to about 150 ppm phosphorus, based on the weight of the DEG modified PET copolyester. Preferably, the catalyst residues comprise 40 to 80 ppm manganese, 150 to 250 ppm antimony, 10 to 50 ppm titanium and 50 to 150 ppm phosphorus.

The color control agent residues comprise either organic or inorganic toners. Cobalt, the inorganic toner, is present in an amount of 40 to 100 ppm cobalt, preferably 65 to 100 ppm, based on the weight of the copolyester. Cobalt is preferably added as a salt. Examples of suitable cobalt salts are cobaltous acetate tetrahydrate, cobaltous nitrate, cobaltous chloride, cobalt acetylacetonate, cobalt naphthanate and cobalt salicyl salicylate.

The organic toners are either 1) blue compounds of substituted 1,4-bis(2,6-dialylanilino) anthraquinone(s) in combination with certain red compounds of anthraquinones as disclosed in U.S. Pat. No. 5,372,864 and herein incorporated by reference or 2) 1-cyano-3H-dibenz[f,ij] isoquinoline-2,7-diones as disclosed in U.S. Pat. No. 4,745,174 and herein incorporated by reference.

The organic toner of the '864 patent comprises at least one blue substituted 1,4-bis(2,6-dialylanilino) anthraquinone(s) of the formula I:

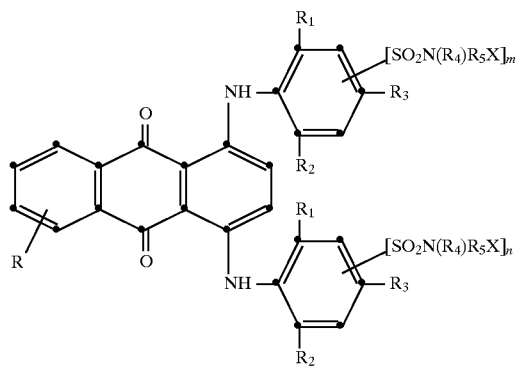  I wherein:

R is selected from the group consisting of hydrogen, $C_1$–$C_6$ alkyl, halogen, carboxy, and $C_1$–$C_6$

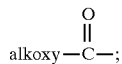

$R_1$ and $R_2$ are independently $C_1$–$C_6$-alkyl;

$R_3$ is selected from the group consisting of hydrogen, halogen, $C_1$–$C_6$-alkyl, substituted $C_1$–$C_6$ alkyl, hydroxy, $C_1$–$C_6$-alkoxy, substituted $C_1$–$C_6$-alkoxy, cyano, thiocyano, $C_1$–$C_6$-alkylthio, substituted $C_1$–$C_6$-alkylthio, $C_1$–$C_6$-alkylsulfonyl, substituted $C_1$–$C_6$-alkylsulfonyl, $C_1$–$C_6$-alkoxycarbonyl, carboxy, aryloxy, arylthio, aryl-sulfonyl, and $SO_2N(R_4)R_5X$ when m and/or n are zero;

$R_4$ is selected from the group consisting of hydrogen, $C_1$–$C_6$-alkyl, substituted $C_1$–$C_6$-alkyl, $C_3$–$C_8$-alkenyl, $C_3$–$C_8$-alkynyl, $C_3$–$C_7$-cycloalkyl and aryl;

$R_5$ is a linking group selected from the group consisting of $C_1$–$C_8$-alkylene, $C_1$–$C_6$-alkylene-Z-$C_1$–$C_6$-alkylene, arylene-$C_1$–$C_6$-alkylene, arylene-Z-$C_1$–$C_6$-alkylene, $C_3$–$C_7$-cycloalkylene, $C_1$–$C_6$-alkylene-cycloalkylene-$C_1$–$C_6$-alkylene, $C_1$–$C_6$-alkylene-arylene-$C_1$–$C_6$-alkylene, and $C_1$–$C_6$-alkylene-Z-arylene-Z-$C_1$–$C_6$-alkylene, wherein Z is selected from —O—, —S— or $SO_2$;

X is hydrogen or a polyester reactive group; and m and n are independently 0 or 1; with the proviso that at least one polyester reactive group is present.

The red compounds of the organic toners of the '864 patent, which may be blended with the blue compounds of formula I above, have the following structural formulae II–X:

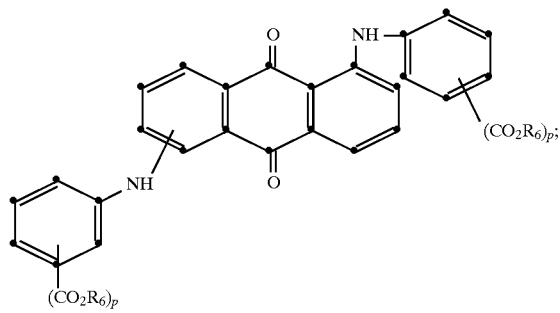  II

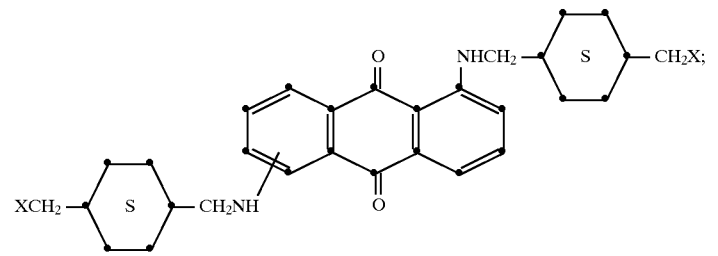  III

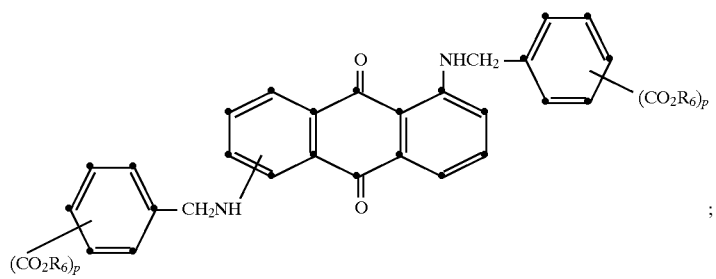
IV
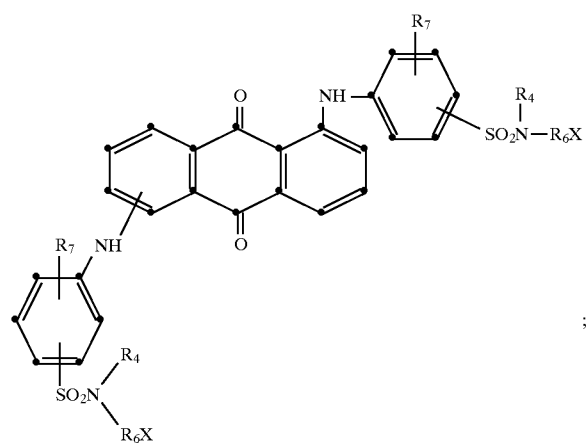
V
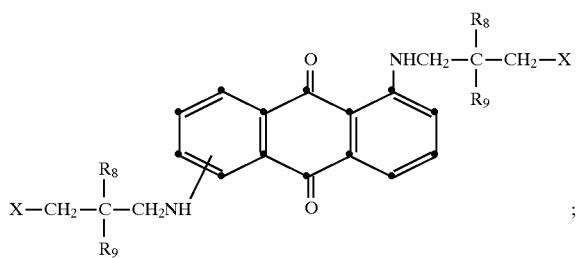
VI
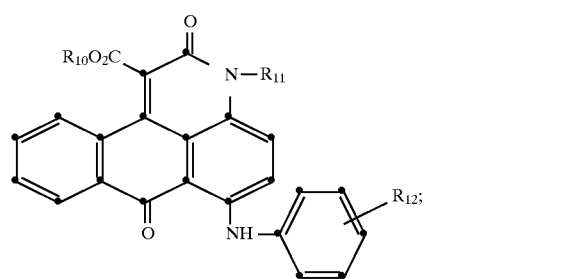
VII
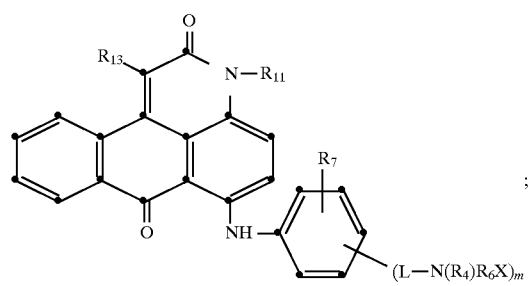
VIII

-continued

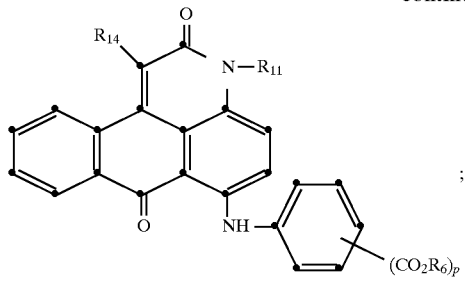

and

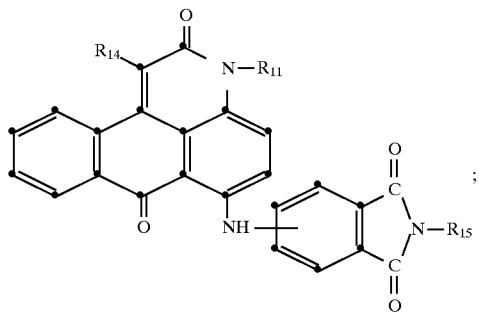

wherein:

$R_6$ is selected from the group consisting of hydrogen, $C_1$–$C_6$-alkyl, substituted $C_1$–$C_6$-alkyl, $C_3$–$C_7$-cycloalkyl or aryl;

$R_7$ is hydrogen or one to three groups selected from $C_1$–$C_6$-alkyl, substituted $C_1$–$C_6$ alkyl, $C_1$–$C_6$-alkanoylamino, halogen, hydroxy, $C_1$–$C_6$-alkyl $C_1$–$C_6$-alkoxy, $C_1$–$C_6$-alkylthio;

$R_8$ and $R_9$ are the same or different and are selected from the group consisting of $C_1$–$C_6$-alkyl, substituted $C_1$–$C_6$-alkyl, $C_3$–$C_7$-cycloalkyl or aryl;

$R_{10}$ is selected from the group consisting of $C_1$–$C_6$-alkyl, $C_3$–$C_7$-cycloalkyl or aryl;

$R_{11}$ is selected from the group consisting of hydrogen, $C_1$–$C_{12}$-alkyl, substituted $C_1$–$C_{12}$-alkyl, $C_3$–$C_7$-cycloalkyl and aryl;

$R_{12}$ is hydrogen or one to three groups selected from the group consisting of $C_1$–$C_6$-alkyl, substituted $C_1$–$C_6$-alkyl, $C_1$–$C_6$-alkoxy, substituted $C_1$–$C_6$-alkoxy, $C_1$–$C_6$-alkylthio, substituted $C_1$–$C_6$-alkylthio, halogen, hydroxy, $C_1$–$C_6$-alkanoylamino, aroylamino, $C_1$–$C_6$-alkylsulfonylamino and arylsulfonylamino;

$R_{13}$ and $R_{14}$ are selected from hydrogen, cyano or $CO_2R_{10}$;

$R_{15}$ is $R_4$ or $R_5X$ as previously defined;

L is —CO— or —SO$_2$—; X is as previously defined; m is 0 or 1; p is 1 or 2; with the provisos that $R_{13}$ is hydrogen when m is 0 and at least one polyester reactive group is present.

The organic toners of the '864 patent are present in amounts of 1.5 to 10 ppm for the blue compounds and 0.5 to 6 ppm for the red compounds, based on the weight of the copolyester. The preferred amount of the blue compounds is 2.8 to 7 ppm. The preferred amount of the red compounds is 0.8 to 4 ppm.

The organic toners of the '174 patent are substituted 1-cyano-3H-dibenzo [f,ij] isoquinoline-2,7-diones having the following structural formula

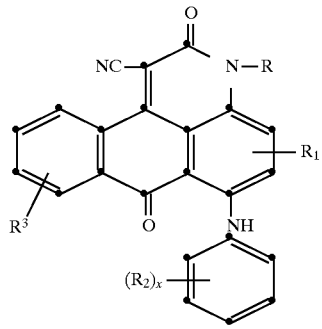

wherein

R is hydrogen, cycloalkyl, allyl, alkyl, aralkyl, alkoxyalkyl or cycloalkylalkylene;

$R_1$ is hydrogen, halogen, alkyl, alkoxy, aryloxy, alkylthio, or arylthio;

$R_2$ is hydrogen, halogen, alkyl, aryl, alkoxy, arylalkoxy, alkylthio, arylthio, carbalkoxy, carbalkoxy, carboxy, sulfamoyl, alkylsulfonamoyl, dialkylsulfamoyl, alkylarylsulfamoyl, cycloalkylsulfamoyl, aryl sulfamoyl, carbamoyl, alkylcarbamoyl, dialkylcarbamoyl, alkylaryl-carbamoyl, cycloalkylcarbamoyl, arylcarbamoyl, 2-pyrrolidone, acylamido or N-alkylacylamido;

$R_3$ is one or more residues selected from the group consisting of hydrogen, halogen, alkyl and alkoxy;

x is an integer of 1 to 5;

wherein one or more alkyl, alkoxy, aryl, aryloxy, alkylthio, arylthio or aralkyl groups may contain one or more reactive residues selected from the group consisting of carboxy, carbalkoxy, carbaryloxy, N-alkylcarbamoyloxy, carbamoyloxy, acyloxy, chlorocarbonyl, hydroxyl, cycloalkylcarbonyloxy, N-arylcarbamoyloxy and N,N-dialkylcarbamoyloxy, wherein said alkyl and aryl groups may further contain substituents such as alkoxy, acyloxy, halogen, cyano, hydroxy and acylamido.

The preferred 1-cyano-3H-dibenzo [f,ij] isoquinoline-2,7 diones of the instant invention are those illustrated by the formula

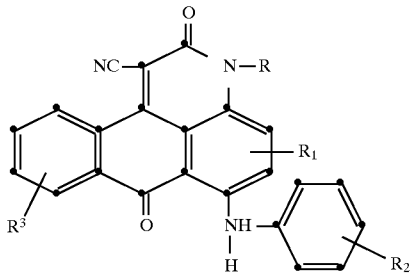

wherein R is methyl, $R_1$ is hydrogen, $R_3$ is hydrogen and $R_2$ is 4'-(2 hydroxyethyl).

Another preferred toner of the instant invention is that compound wherein R is methyl, $R_1$ is hydrogen, $R_3$ is hydrogen and $R_2$ is 4'-(2-hydroxyethoxy).

These organic toners of Formula XI and XII are present in amounts of about 0.5 to 10 ppm, preferably 1 to 5 ppm, based on the weight of the DEG modified PET copolyester.

For component (b) the percentage by weight in the copolyester blend is preferably 95 to 10, more preferably 60 to 15 and even more preferably 40 to 15.

Component (c) is present in the copolyester blend at about 0.5 to about 3 percent by weight, preferably 1 to 2 percent. The anti-blocking agent is preferably dispersed in the copolyester of component (a) above. Examples of anti-blocking agent useful in the present invention include amorphous silica powder and microcrystalline silica powder. The silica powders are preferably dispersed into a portion of PETG copolyester by compounding and then the resulting material is extruded and/or pelletized. These pellets are commercially available from Eastman Chemical Company of Kingsport, Tenn.

Preferably the heat-shrinkable films of the present invention comprise the optional component (d) in amounts of about 5 to about 15 percent by weight, preferably 8 to 12 percent. Component (d) is a crystallizable polyester such as polyethylene terephthalate comprising residues of at least 95 mol percent terephthalic acid and at least 95 mol percent ethylene glycol. Preferably component (d) has a $T_g$ of 70°–90° C., preferably about 75°–79° C.

The copolyester blends of the present invention may include any various additives conventional in the art. There are, for example, titanium dioxide, granulated silica, kaolin, calcium carbonate, and other lubricants; antistatic agents; ultraviolet-light absorbants; pigments; dyes; plasticizers; stabilizers; etc.

The polyesters and copolyesters of the present invention are prepared by conventional polycondensation processes well known in the art, such as the process described in U.S. Pat. Nos. 2,901,466; 2,465,319 and 3,047,539. These include direct condensation of the acid(s) with the glycol(s) or by ester interchange using ester-forming derivatives. Such derivatives include functional acid derivatives such as the dimethyl, diethyl, or dipropyl ester of the dicarboxylic acid and anhydrides or acid halides of acids.

The inherent viscosity of the polyesters or copolyesters, components (a)–(d), useful in the copolyester blends of the present invention may range from about 0.5 to 1.0 Dl/g, a preferred range being about 0.6 to about 0.8 Dl/g, and a more preferred range being about 0.65 to about 0.75 Dl/g as measured at 25° C. in a solvent mixture consisting of 60 percent by weight phenol and 40 percent by weight tetrachloroethane.

The above polyesters and copolyesters in the blend are formed into a film by any well-known method such as extrusion, calendaring, etc. The polyesters and copolyesters, typically in pellet, form are mixed together by weight in a tumbler and then placed in a hopper of an extruder for melting compounding. Alternatively, the pellets may be added to the hopper of an extruder by various feeders which meter the pellets in their desired weight ratios. Upon exiting the extruder the now homogeneous copolyester blend is shaped into a film. The shape of the film is not restricted in any way. For example, it may be a flat sheet or a tube. The film obtained may be stretched, for example, in a certain direction by from 2 to 6 times the original measurements.

The stretching method may be by any usual method such as the roll stretching method, the long-gap stretching method, the tenter-stretching method, and the tubular stretching method. With use of any of these methods, it is possible to conduct biaxial stretching in succession, simultaneous biaxial stretching, uni-axial stretching, or a combination of these. With the biaxial stretching mentioned above, stretching in the machine direction and transverse direction may be done at the same time. Also the stretching may be done first in one direction and then in the other direction to result in effective biaxial stretching.

Preferably, in the stretching mentioned above, the film is preliminarily heated at a temperature in the range of a mean glass transition temperature ($T_g$) of the polymer composition constituting the film to $T_g+5°$ C. to $T_g+80°$ C., preferably $T_g+10°$ C. to $T_g+20°$ C. Preferably the stretch rate is 5–20 in./sec. Stretch ratio is defined as the draw ratio in the x-axis direction to the draw ratio in the y-axis direction. The draw ratio is the final length of the film divided by the original length of the film.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise noted. All percentages are by weight unless otherwise noted.

EXAMPLE 1

$T_g$ reduction

The decrease of the on-set temperature of film made from the PETG/DEG modified PET blends depends on miscibility of the blends and efficiency of glass transition temperature reduction by the addition of the low $T_g$ (° C.) DEG modified PET, i.e. EASTOBOND, to PETG. Blends having different weight percentages of either "old" EASTOBOND (b* color value about 25 in pellet form or about 5 in film form) or improved clarity EASTOBOND (b* color value about 11 in pellet form or about 1.3 in film form) with PETG were prepared by mixing the predried polymers in a tumbler for approximately 30 minutes until a homogeneous mixture resulted. The well mixed pellets were then placed in the hopper of an extruder, melted and extruded into sheet. The sheet samples were then measured for their individual glass transition temperatures. Table I demonstrates the reduction in $T_g$ of the PETG by adding either "old" EASTOBOND or improved clarity EASTOBOND. Both "old" and improved clarity EASTOBONDs were miscible (single $T_g$ in DSC) and showed comparable reduction efficiency in $T_g$ reduction.

EXAMPLE 2

Color Improvement

The same sheet samples prepared in Example 1 for blends with "old" EASTOBOND and improved clarity EASTO- BOND were measured for the b* color value. As shown in Table I, the blends using improved clarity EASTOBOND had only about one fourth of b* color value compared to the counterpart using the "old" EASTOBOND. Thus, the amount of improved clarity EASTOBOND that can be added to the blend is at least four times greater than that of the "old" EASTOBOND. For example, if 10 percent by weight is the upper limit for using "old" EASTOBOND in PETG/EASTOBOND blends, based on the present invention at least 40 percent by weight of improved clarity EASTOBOND may be used without surpassing the haze threshold of the final heat-shrinkable film product. With continual fine tuning of the manufacturing process in large production line, the b* color value of the new EASTOBOND will be further reduced which implies 40 percent or higher percentage of new EASTOBOND can be safely used in shrink film manufacturing without sacrificing the optical properties of the final film product.

TABLE I $T_g$ (°C.) Reduction and Color Improvement

| % EASTOBOND | Blend with Old EASTOBOND | | Blend with Improved EASTOBOND | |
| --- | --- | --- | --- | --- |
| | $T_g$ | b* | $T_g$ | b* |
| 0 | 80 | 0.09 | 80 | 0.09 |
| 10 | 76 | 0.61 | 78 | 0.15 |
| 20 | 72 | 1.13 | 73 | 0.24 |
| 30 | 69 | 1.80 | 70 | 0.34 |
| 40 | 66 | 2.21 | 66 | 0.55 |
| 50 | 61 | 2.97 | 63 | 0.59 |
| 60 | 60 | 3.28 | 61 | 0.74 |
| 70 | 58 | 4.09 | 59 | 0.90 |
| 80 | 55 | 4.44 | 57 | 0.96 |
| 90 | 55 | 4.19 | 56 | 1.03 |
| 100 | 52 | 5.32 | 53 | 1.30 |

EXAMPLE 3

PVC

PVC was extruded into 8-mil film. Extruded film was then stretched at 90° C. into 3×1 shrink film using a tenter frame, available from Marshall and Williams Company of Providence, R.I. Tenter frame stretching results in stretching in the transverse direction.

The stretched film was then cut into 100×100 mm specimens. The specimen was placed in a sample holder, free from contact with the edges of the holder, and immersed in a constant-temperature water bath for 30 seconds at 90° C. The specimen was then removed from the water bath and quickly dried at room temperature. The thermal shrinkage in the stretch direction was then recorded by measuring the linear dimension, L in mm, of the specimen using a rule. A minimum of 2 specimens was necessary for each test temperature (ASTM D2732-83). The percent shrinkage is then calculated as follows:

$$S, \% = \frac{100 - L}{100} \times 100\%$$

The onset temperatures for the film was also recorded. Table II displays the results.

EXAMPLE 4

PETG

The procedure for Example 3 was followed for extruded film made from PETG 6763, available from Eastman Chemical Co. of Kingsport, Tenn. The film was stretched at 90° C. and 4×1 stretch ratio.

EXAMPLE 5

Blends of PETG and EASTOBOND

The blends of different weight percentages of improved clarity EASTOBOND with PETG from Table I were extruded and stretched at 15° C. above the $T_g$ of each extruded sheet. The stretch ratio was 4×1. The procedures of Example 3 were followed. The on-set temperature and shrinkage at 90° C. of each blend are tabulated in Table II. All the blend films had high enough shrinkage at 90° C. compared to PVC. The on-set temperature of the blends continued to decrease with increasing level of improved clarity EASTOBOND in the blend. The blend with 25 percent of improved clarity EASTOBOND shows an identical on-set temperature as PVC. A PVC-type film therefore can be duplicated by adding appropriate amount of improved clarity EASTOBOND into PETG. In addition, the on-set temperature of blend with more than 25 percent of improved clarity EASTOBOND is even lower than that of PVC.

A whole spectrum of heat-shrinkable film with continual reduction in Tg can be produced based on the different levels of blending using the miscible and improved clarity EASTOBOND. This clearly demonstrates the innovation and technology to produce heat-shrinkable films with high to very low on-set temperatures to satisfy different applications.

TABLE II

Onset Temperature and Shrinkage

| Material | On-Set Temperature, °C. | Shrinkage @ 90° C., % |
| --- | --- | --- |
| PVC | 60 | 58 |
| PETG | 65 | 71 |
| 10% EB + 90% PETG | 64 | 67 |
| 20% EB + 80% PETG | 61 | 68 |
| 25% EB + 75% PETG | 60 | 63 |
| 30% EB + 70% PETG | 59 | 66 |
| 40% EB + 60% PETG | 57 | 69 |
| 50% EB + 50% PETG | 55 | 67 |
| 75% EB + 25% PETG | 53 | 73 |
| 100% EB | 45 | 73 |

With the innovation of the new catalysis system and color control agent, the improved clarity DEG modified PET having a b* color value in pellet form less than 10 may be produced. The problem of haze with increasing level of DEG modified PET in the copolyester blend of the present invention is therefore no longer existing. The freedom to add any amount of DEG modified PET to PETG also make it very versatile in producing a wide spectrum of shrink film with an on-set temperature even lower than typical PVC. The color improvement coupled with on-set adjustability provide product and processing advantages.

This invention has been described in detail with particular reference to preferred embodiments and methods thereof, but it will be understood that variations and modifications can be effected within the spirit and scope of the invention.

I claim:

1. A heat-shrinkable film comprising a copolyester blend of:

(a) about 1 to about 98.5 percent by weight of a PETG copolyester comprising 100 mol percent dicarboxylic acid residue component of at least 95 mol percent terephthalic acid residues and 100 mol percent diol residue component of about 65 to about 80 mol percent ethylene glycol residues and about 35 to about 20 mol percent 1,4-cyclohexanedimethanol residues;

(b) about 98.5 to about 1 percent by weight of a DEG modified PET copolyester having a b* color value in pellet form of less than 15 and comprising:

1. 100 mol percent dicarboxylic acid residue component comprising at least 75 mol percent of terephthalic acid residues;
2. 100 mol percent diol residue component comprising 10 to 50 mol percent diethylene glycol residue and 50 to 90 mol percent ethylene glycol residue;
3. catalyst residues comprising 20 to 100 ppm manganese, 50 to 300 ppm antimony, 0 to 100 ppm titanium and 40 to 150 ppm phosphorus, based on the weight of the DEG modified PET copolyester; and
4. color control agent residues with all weights in ppm based on the weight of the DEG modified PET copolyester selected from the group consisting of
   (i) 40 to 100 ppm cobalt;
   (ii) 1.5 to 10 ppm of a blue compound having the formula I:

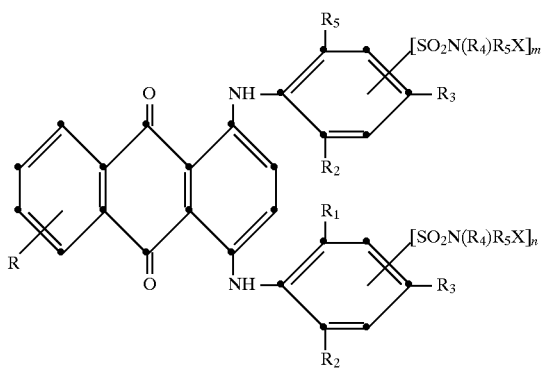

wherein:
R is selected from the group consisting of hydrogen, $C_1$–$C_6$ alkyl, halogen, carboxy, and $C_1$–$C_6$ alkoxy

$R_1$ and $R_2$ are independently $C_1$–$C_6$-alkyl;
$R_3$ is selected from the group consisting of hydrogen, halogen, $C_1$–$C_6$-alkyl, substituted $C_1$–$C_6$ alkyl, hydroxy, $C_1$–$C_6$-alkoxy, substituted $C_1$–$C_6$-alkoxy, cyano, thiocyano, $C_1$–$C_6$-alkylthio, substituted $C_1$–$C_6$-alkylthio, $C_1$–$C_6$-alkylsulfonyl, substituted $C_1$–$C_6$-alkylsulfonyl, $C_1$–$C_6$-alkoxycarbonyl, carboxy, aryloxy, arylthio, arylsulfonyl, and $SO_2N(R_4)R_5X$ when m and/or n are zero;
$R_4$ is selected from the group consisting of hydrogen, $C_1$–$C_6$-alkyl, substituted $C_1$–$C_6$-alkyl, $C_3$–$C_8$-alkenyl, $C_3$–$C_8$-alkynyl, $C_3$–$C_7$-cycloalkyl and aryl;
$R_5$ is a linking group selected from the group consisting of $C_1$–$C_8$-alkylene, $C_1$–$C_6$-alkylene-Z-$C_1$–$C_6$-alkylene, arylene-$C_1$–$C_6$-alkylene, arylene-Z-$C_1$–$C_6$-alkylene, $C_3$–$C_7$-cycloalkylene, $C_1$–$C_6$-alkylene-cycloalkylene-$C_1$–$C_6$-alkylene, $C_1$–$C_6$-alkylene-arylene-$C_1$–$C_6$-alkylene, and $C_1$–$C_6$-alkylene-Z-arylene-Z-$C_1$–$C_6$-alkylene, wherein Z is selected from —O—, —S— or $SO_2$; X is hydrogen or a polyester reactive group; and m and n are independently 0 or 1; with the proviso that at least one polyester reactive group is present and 0.5 to 6 ppm of a red compound having the structural formulae II–X:

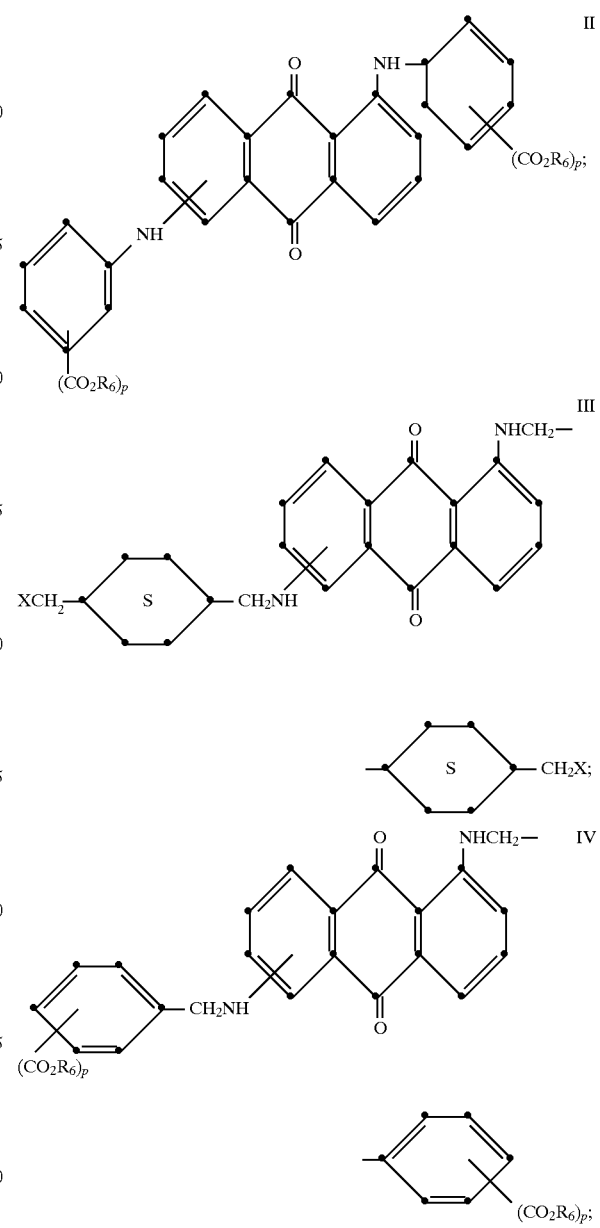

-continued

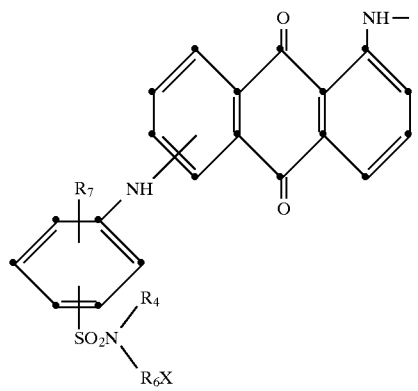
V

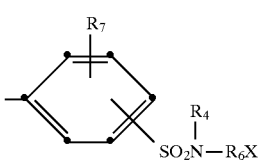

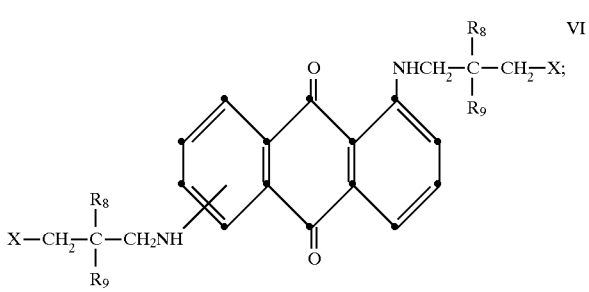
VI

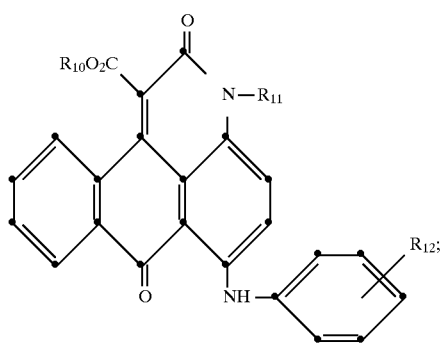
VII

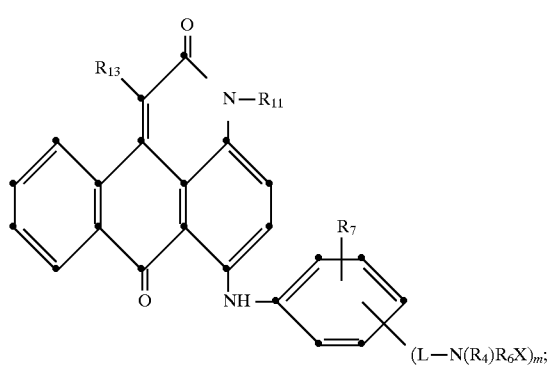
VIII

-continued

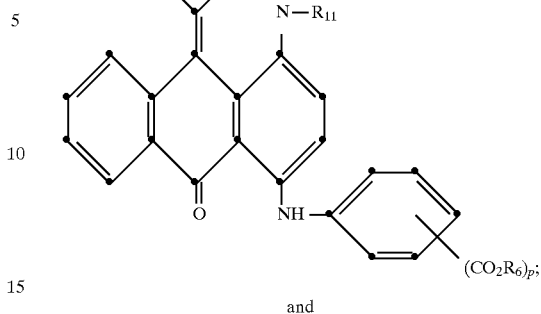
IX and

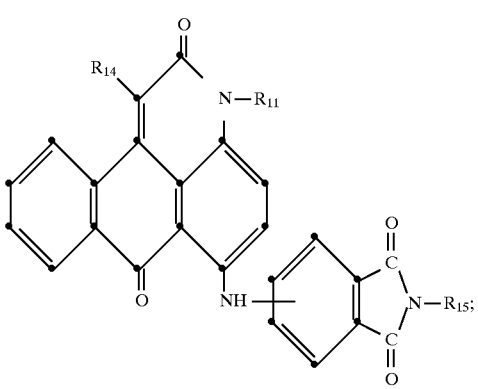
X wherein:

$R_6$ is selected from the group consisting of hydrogen, $C_1$–$C_6$-alkyl, substituted $C_1$–$C_6$-alkyl, $C_3$–$C_7$-cycloalkyl or aryl;

$R_7$ is hydrogen or one to three groups selected from $C_1$–$C_6$-alkyl, substituted $C_1$–$C_6$ alkyl, $C_1$–$C_6$-alkanoylamino, halogen, hydroxy, $C_1$–$C_6$-alkyl $C_1$–$C_6$-alkoxy, $C_1$–$C_6$-alkylthio;

$R_8$ and $R_9$ are the same or different and are selected from the group consisting of $C_1$–$C_6$-alkyl, substituted $C_1$–$C_6$-alkyl, $C_3$–$C_7$-cycloalkyl or aryl;

$R_{10}$ is selected from the group consisting of $C_1$–$C_6$-alkyl, $C_3$–$C_7$-cycloalkyl or aryl;

$R_{11}$ is selected from the group consisting of hydrogen, $C_1$–$C_{12}$-alkyl, substituted $C_1$–$C_{12}$-alkyl, $C_3$–$C_7$-cycloalkyl and aryl;

$R_{12}$ is hydrogen or one to three groups selected from the group consisting of $C_1$–$C_6$-alkyl, substituted $C_1$–$C_6$-alkyl, $C_1$–$C_6$-alkoxy, substituted $C_1$–$C_6$-alkoxy, $C_1$–$C_6$-alkylthio, substituted $C_1$–$C_6$-alkylthio, halogen, hydroxy, $C_1$–$C_6$-alkanoylamino, aroylamino, $C_1$–$C_6$-alkylsulfonylamino and arylsulfonylamino;

$R_{13}$ and $R_{14}$ are selected from hydrogen, cyano or $CO_2R_{10}$;

$R_{15}$ is $R_4$ or $R_5X$ as previously defined;

L is —CO— or —$SO_2$—; X is hydrogen or a polyester reactive group; m is 0 or 1; p is 1 or 2; with the provisos that $R_{13}$ is hydrogen when m is 0 and at least one polyester reactive group is present; and (iii) 0.5 to 10 ppm of a compound having the formula (XI):

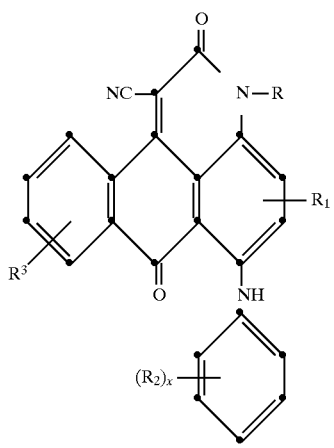

XI wherein

R is hydrogen, cycloalkyl, allyl, alkyl, aralkyl, alkoxy-alkyl or cycloalkylalkylene;

$R_1$ is hydrogen, halogen, alkyl, alkoxy, aryloxy, alkylthio, or arylthio;

$R_2$ is hydrogen, halogen, alkyl, aryl, alkoxy, arylalkoxy, alkylthio, arylthio, carbalkoxy, carbalkoxy, carboxy, sulfamoyl, alkylsulfonamoyl, dialkylsulfamoyl, alkylarylsulfamoyl, cycloalkylsulfamoyl, aryl sulfamoyl, carbamoyl, alkylcarbamoyl, dialkylcarbamoyl, alkylarylcarbamoyl, cycloalkylcarbamoyl, arylcarbamoyl, 2-pyrrolidone, acylamido or N-alkylacylamido;

$R_3$ is one or more residues selected from the group consisting of hydrogen, halogen, alkyl and alkoxy;

x is an integer of 1 to 5;

wherein one or more alkyl, alkoxy, aryl, aryloxy, alkylthio, arylthio or aralkyl groups may contain one or more reactive residues selected from the group consisting of carboxy, carbalkoxy, carbaryloxy, N-alkylcarbamoyloxy, carbamoyloxy, acyloxy, chlorocarbonyl, hydroxyl, cycloalkylcarbonyloxy, N-arylcarbamoyloxy and N,N-dialkylcarbamoyloxy, wherein said alkyl and aryl groups may further contain substituents such as alkoxy, acyloxy, halogen, cyano, hydroxy and acylamido;

(c) about 0.5 to about 3 percent by weight of an antiblocking agent.

2. The heat-shrinkable film of claim 1 wherein the b* color value of the DEG modified PET is less than 10.

3. The heat-shrinkable film of claim 1 wherein the antiblocking agent comprises microcrystalline silica powder which is dispersed in a portion of the PETG copolyester (a).

4. The heat-shrinkable film of claim 1 further comprising (d) about 5 to about 15 percent by weight of a polyester comprising 100 mol percent dicarboxylic acid residue component comprising at least 95 mol percent polyethylene terephthalate and 100 mol percent diol residue component comprising at least 95 mol percent ethylene glycol.

5. The heat-shrinkable film of claim 1 wherein the DEG modified PET copolyester has 2.8 to 7 ppm blue compound and 0.8 to 4 ppm red compound in the color control agent residue of (ii).

* * * * *